(12) United States Patent
Kim et al.

(10) Patent No.: US 8,396,918 B2
(45) Date of Patent: Mar. 12, 2013

(54) SERVICE FRAMEWORK FOR A HOME NETWORK

(75) Inventors: Kyle Kim, Suwon-si (KR); In-ho Park, Suwon-si (KR); Sang-ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 11/358,003

(22) Filed: Feb. 22, 2006

(65) Prior Publication Data

US 2006/0190940 A1    Aug. 24, 2006

(30) Foreign Application Priority Data

Feb. 22, 2005    (KR) .................. 10-2005-0014599

(51) Int. Cl.
*G06F 15/173*    (2006.01)
(52) U.S. Cl. ........ 709/203; 709/220; 709/228; 370/352; 370/485
(58) Field of Classification Search .................. 709/203, 709/226; 719/310; 455/414, 422; 707/3, 707/7; 370/485
See application file for complete search history.

(56) References Cited

U.S. PATENT DOCUMENTS

| | | |
|---|---|---|
| 6,349,352 B1 | 2/2002 | Lea |
| 6,363,434 B1 | 3/2002 | Eytchison |
| 6,405,261 B1 | 6/2002 | Gaucher |
| 6,434,447 B1 | 8/2002 | Shteyn |
| 6,542,754 B1 * | 4/2003 | Sayers et al. .................. 455/502 |
| 7,002,995 B2 * | 2/2006 | Chow et al. .................. 370/485 |
| 7,010,303 B2 * | 3/2006 | Lewis et al. .................. 455/445 |
| 7,277,693 B2 * | 10/2007 | Chen et al. .................. 455/414.1 |
| 7,860,524 B2 * | 12/2010 | Laible et al. .................. 455/518 |
| 8,131,838 B2 * | 3/2012 | Bornhoevd et al. .......... 709/224 |
| 2002/0029256 A1 | 3/2002 | Zintel et al. |
| 2002/0086706 A1 * | 7/2002 | Chen et al. .................. 455/560 |
| 2002/0174073 A1 * | 11/2002 | Nordman et al. .............. 707/3 |
| 2002/0177453 A1 * | 11/2002 | Chen et al. .................. 455/466 |
| 2003/0004934 A1 * | 1/2003 | Qian .............................. 707/3 |
| 2003/0004937 A1 * | 1/2003 | Salmenkaita et al. ........... 707/3 |
| 2003/0054810 A1 * | 3/2003 | Chen et al. .................. 455/422 |
| 2004/0003073 A1 | 1/2004 | Krzyzanowski et al. |
| 2004/0139177 A1 | 7/2004 | Yook |
| 2004/0204073 A1 * | 10/2004 | Yanosy ........................ 455/557 |
| 2005/0015772 A1 * | 1/2005 | Saare et al. .................. 719/310 |
| 2005/0240672 A1 * | 10/2005 | Chen et al. .................. 709/229 |
| 2006/0072525 A1 * | 4/2006 | Hillyard et al. ............... 370/338 |
| 2008/0176548 A1 * | 7/2008 | Liang .......................... 455/419 |
| 2011/0082881 A1 * | 4/2011 | Chunilal ....................... 707/770 |

FOREIGN PATENT DOCUMENTS

| | | |
|---|---|---|
| CN | 1481118 A | 3/2004 |
| EP | 0 853 401 A2 | 7/1998 |
| EP | 1 394 986 A1 | 3/2004 |
| JP | 2001-060972 A | 3/2001 |
| JP | 2002-354556 A | 12/2002 |
| JP | 2004-007297 A | 1/2004 |
| KR | 2001-7002315 A | 2/2001 |
| WO | WO 03/049370 A2 | 6/2003 |

* cited by examiner

*Primary Examiner* — Khanh Dinh
(74) *Attorney, Agent, or Firm* — Sughrue Mion, PLLC

(57) ABSTRACT

A service framework which can control devices to be controlled according to a device/service profile by creating the device/service profile to control a plurality of the controlled devices. Accordingly without using a middleware with a complicated structure, it is possible to control home devices.

18 Claims, 4 Drawing Sheets

| Device Description (i.e. Name, Model, Manufacture, etc.) | | | | | | |
|---|---|---|---|---|---|---|
| Service Description (i.e. Profile ID, version, what does it do, etc...) | | | | | | |
| Service Name | Description | Current Value | Default Value | Etc. | ... | |
| Power | Turns unit on or off | OFF | OFF | | | |
| Speed | Speed of fan | 0 | 1 | 0 ~ 4 | | |
| Rotate | Rotate rotor head | OFF | Off | | | |
| | | | | | | |

SERVICE FRAMEWORK FOR A HOME NETWORK

CROSS-REFERENCE TO RELATED APPLICATIONS

This application claims benefit under 35 U.S.C. §119 from Korean Patent Application No. 2005-14599, filed on Feb. 22, 2005, in the Korean Intellectual Property Office, the entire content of which is incorporated herein by reference.

BACKGROUND OF THE INVENTION

1. Field of the Invention

The present invention relates to a home network, and in particular, relates to a structure of a service framework including a device/service profile, and a method thereof.

2. Description of the Related Art

A home network system is a system which connects PCs, peripheral devices, mobile phones, home appliances and etc. in a home into one network, and controls them. A method for building up a common virtual computing environment that is referred to as middleware amongst respective home appliances, and for providing an application, is suggested as one of the structures of the home network system.

A home network middleware provides an environment which is controlled for allowing a general user to use various devices connected to the home network where the user can use the existing home appliances without having to acquire any special knowledge to use them, and also provides development of various application services of the home network, and execution platforms.

That is, the middleware enables communication among many devices in a home network. Until now, HAVi (Home AV Interoperability), UPnP (Universal Plug and Play), PLC (Power Line communication), Jini, and HWW (Home Wide Web) have been suggested as home network middleware.

FIG. 1 shows a network system using such a conventional middleware. That is, FIG. 1 shows home devices, each of which includes a middleware. A UPnP network 10 is a software technology which can form one network without any additional equipment by expanding a plug-and-play concept for connecting PCs and peripheral devices, when all home appliances as well as the peripheral devices of PCs are arranged in a home at the same time. It is a middleware for IT devices and has a peer-to-peer architecture.

A PLC network 20 is a technology which forms the most extensive network of the existing infra structure since the power source lines are provided to all homes. There is a benefit that the cost required for forming a network is very low, and it is characterized in that when an electrical cord is inserted into the home appliances, the cord and appliances can form a simple network.

A HAVi network 30 is an AV network solution only for the AV devices and uses IEEE1394 as a communication medium. It is operated as a home networking middleware for controlling an image data by using API functions, and has a peer-to-peer architecture.

A Jini is a middleware having a client/server architecture using Java.

But, Jini devices have a limitation that each device must be provided with JVM (Java Virtual Machine) to be integrated into a network, and therefore it is more suitable for an office environment than for home.

The UPnP network 10 is a solution using a hypertext transfer protocol (HTTP) server and extensible markup language (XML), and can not be applied to all homes. The HAVi network 30 is not applied to PCs and peripheral devices, and has a limitation that standards are stipulated only for the upper OSI layers of the home appliances. Further, it focuses only on the applications and the services, and there is a problem with connecting to the Internet since a lower network is limited to IEEE1394.

A common specification is required among the makers which provide the devices which are connected to the same network in order to build up a home network into a home based upon the PLC network 20.

The HAVi network 30 is an AV network solution only for the AV devices using IEEE1394.

But, the above-mentioned middlewares have very complicated structures so as to enable communication among the devices in a home network.

That is, most middlewares except the HAVi use a TCP/IP protocol for communication among the devices and connection with the Internet, and there is a problem that a simple structure can not be realized because of the complicated structure for operating each protocol.

SUMMARY OF THE INVENTION

The present invention is suggested to address the above-mentioned problems. A purpose of an exemplary embodiment of the present invention is to provide a service framework which can be operated simply like a general middleware by using a profile of a device and a service having a meta data format for an artificial intelligence.

The service framework in a home network including a plurality of the controlled devices according to an exemplary embodiment of the present invention, comprises a server which provides a device or/and a service profile which is set to control the controlled devices, and a service client including a plurality of the controlled devices which are operated by the device or the service profile of the server.

The service client can register the device and/or the service profile of a corresponding device to be controlled to the server, and the server monitors the home situations in a real-time basis through an environment sensor, accumulates various environment data, analyzes and diagnoses the data in a real-time basis, derives service information for driving the controlled devices, and registers as the intelligent services or the service profile.

On the other hand, the server comprises a device profile list section for registering a device and/or a service profile of the controlled devices, a profile manager for managing the device and/or the service profile of the device profile list, and for processing the functions such as creation, correction, deletion and search of the service profile, and a service logic section for forming a message for connection between a real service and a structure of a profile having a meta data format defined in the server, and generating and controlling the intelligent device and/or the service profile.

Further, the service client can comprise a device profile section for storing a device and/or a service profile of the controlled devices, a controller which includes an application or a logic element for executing an operation or a service of the controlled devices in order to generate each profile of the controlled devices, and to store it to the device profile section, and a service I/O (input and output) section which operates as an interface for controlling an inside device logic executing the services, and the services. Therefore, the controllers allow the service I/O section to provide the services.

The controller transmits a device and/or a service profile of the controlled devices stored in the device profile section to the server, and registers a device and/or a service profile of the controlled devices to the device profile list section.

Further, if the service logic section transmits a message formed by the intelligent device and/or the service profile to the service client, the controller confirms the information of the controlled devices from the device profile section, and controls the controlled devices to execute the services through the service I/O section according to the service contents.

Further, a control method of a home network comprising a service client including a plurality of the controlled devices, and a server for controlling the service client according to an exemplary embodiment of the present invention comprises a registering step for registering a device and/or a service profile of the controlled devices to the server, to control the respective devices to be controlled and a control step for allowing the service client to control the controlled devices according to the transmitted message based upon the device and/or the service profile which is registered to the server.

Further, registering a device and/or a service profile of the controlled devices to the server includes generating a device and/or a service profile of the controlled devices in the service client, converting the generated device and/or a service profile into a transmission message which can be transmitted through a network, and transmitting it to the server, and allowing the server which receives the transmission message to convert the message into a device and/or a service profile, and to register the message.

Controlling the controlled devices can comprise preparing a transmission message according to a device and/or a service profile of the controlled devices registered to the server, transmitting the transmission message through a network, converting it into a device and/or a service profile by using the transmitted message, and controlling the controlled devices according to a device and/or a service profile.

The service client can store the generated device and/or service profile into a memory, and at the same time, send them to the server, so that the controlled devices can be controlled, only if a device and/or a service profile which is transmitted to the server, and a device and/or a service profile of the controlled devices which is stored into the memory, are compared and judged to be identical.

Further, notifying that the services are executed, to the server while controlling the controlled devices may be included, so that it is possible to confirm whether the services are executed or not in the server.

BRIEF DESCRIPTION OF THE DRAWINGS

Exemplary embodiments of the present invention will be described in detail with reference to the following drawings in which like reference numerals refer to like elements, and wherein.

DETAILED DESCRIPTION OF EXEMPLARY EMBODIMENTS OF THE PRESENT INVENTION

Below, exemplary embodiments according to the present invention will be described in detail by referring to the attached drawings.

Figure 1:
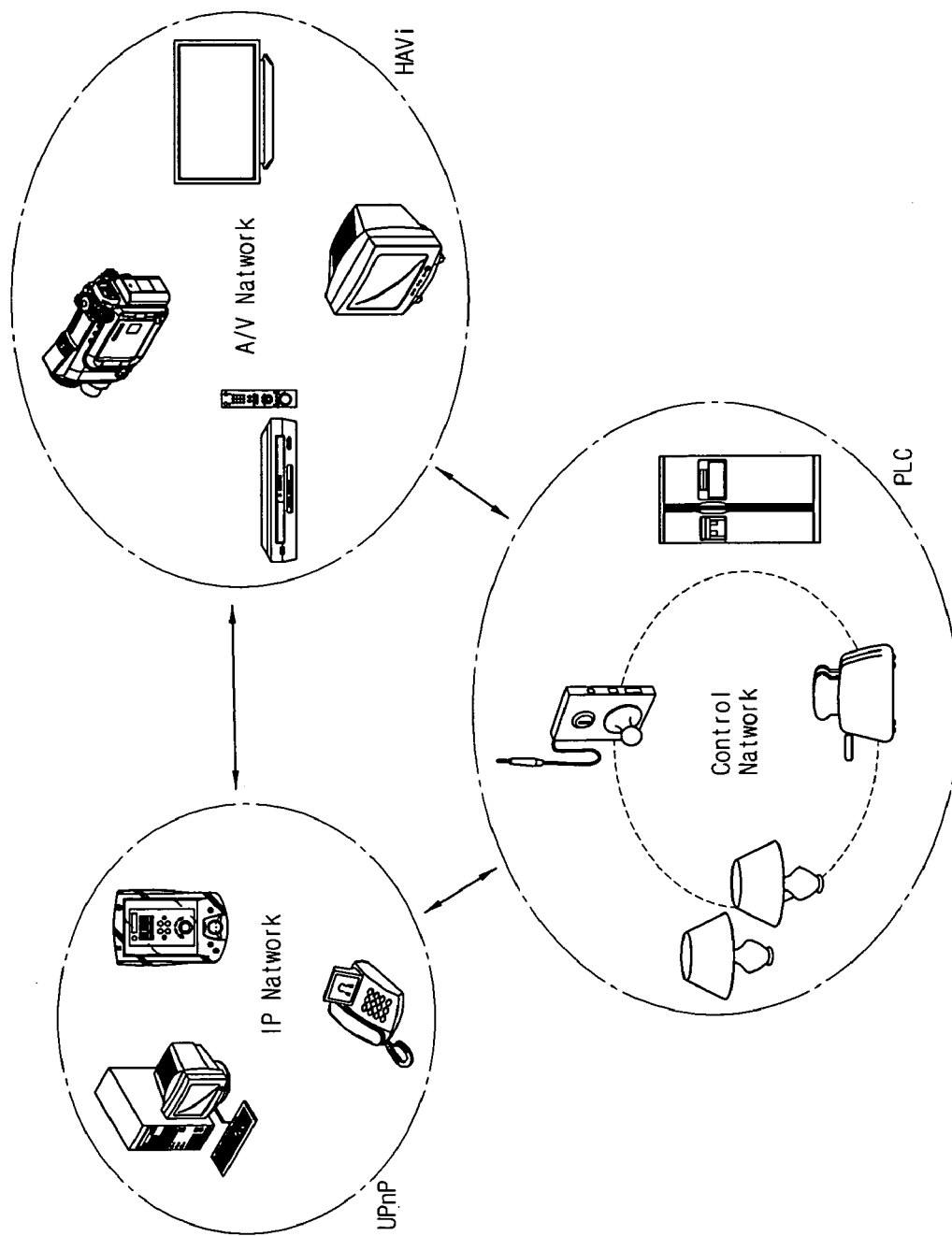
FIG. 1 is a view showing schematically a network system using such a conventional middleware.
Figures 2, 3:
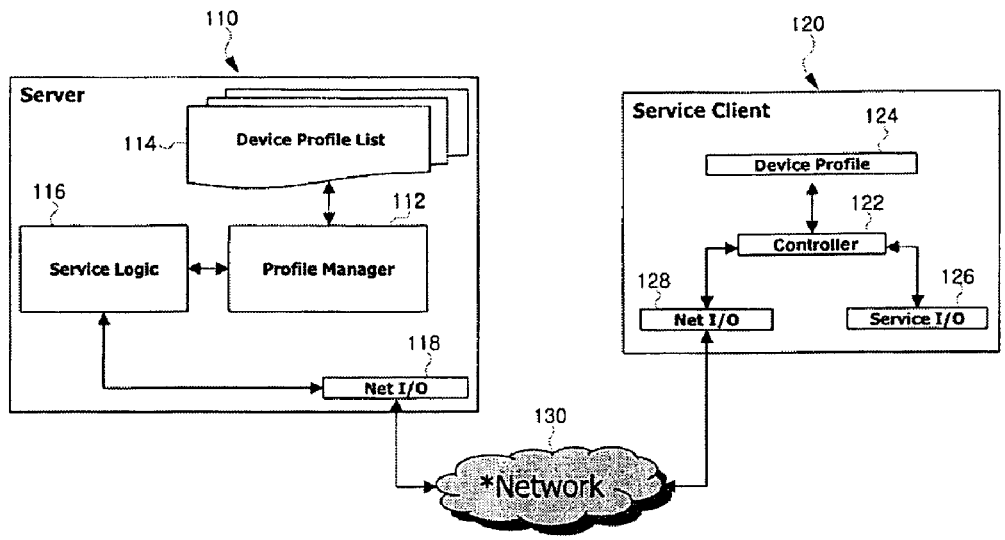
FIG. 2 is a view schematically showing a service framework structure according to an exemplary embodiment of the present invention.
FIG. 3 is a view showing a detailed structure of each device and a service profile.

FIG. 2 is a diagram schematically showing a service framework structure for an artificial intelligence type service according to an exemplary embodiment of the present invention.

As is shown, a home network according to an exemplary embodiment of the present invention is provided with a server 110 for performing the functions which are same to those of a conventional framework, a service client 120 for performing functions for each device in a home network, so that transmission messages can be received and transmitted between them via a network 130. The present invention will be explained on the assumption that a file format transmitted via the network 130 is integrated into a transmission message.

The server 110 is designed to perform a function for managing the services which each device in a home network can provide That is, it manages states and events of each home device.

The server 110 is designed to manage the profiles of a service, so that a device profile list 114, which stores the profiles of all devices, controllable services, and functions of the devices are provided. It includes a profile manager 112 which mainly performs creation, correction, deletion and search functions of a profile, and which operates as an interface for providing many service profiles which may be connected to a home network, a service logic unit 116 including a service application or a service logic which may be provided by each device, and a net I/O 118, which is a network interface for receiving and transmitting the profile to the service client 120 via the network 130.

Further, the service logic unit 116 can be designed to provide an artificial intelligence by setting the service contents including each device in a composite way.

For example, a virtual service environment for allowing DVD to be viewed at a designated time is prepared so that the devices required for DVD viewing such as a DVD, a TV, a curtain and a lighting device can be controlled, if necessary. To be more specific, the curtain is lowered as a first step for viewing DVD, and the suitable illumination necessary for DVD viewing is required. After completion of the operation, a service for allowing a TV to be turned on is requested, and thereby a series of artificial intelligences are provided.

The service client 120 is a device or a node through which services are provided or in which services are performed. It includes a device profile unit 124 storing a device/a service profile, a controller 122 having applications or logic elements for generating each profile of the devices, storing them into the device profile unit 124, and executing operations and services of each device, a service I/O unit 126 which is operated by an interface for controlling inside device logic for executing services or services, and a net I/O 128, which is a network interface for receiving and transmitting the profile for the server 110.

The device/service profile which is stored into the device profile list 114 of the server 110 or the device profile unit 124 of the service client 120 will be explained in detail by referring to FIG. 3.

A device/service profile 200 includes a device description 210 into which a device name, a model name, and a manufacturing company are recorded, and a service description 220 into which a service list which the device provides is recorded.

In the service description 220, the services which the device can provide are recorded in detail, that is, a profile ID, version and functions may be recorded.

Further, the service description 220 includes a service name section 221 into which the name of the services which the device can provide is recorded, a description section 222 in which sufficient explanations are described so that users can recognize them completely, and may be used as specific information about the services, a current value section 223 into which a present state or a value of the device, which is used as a reference value when providing services, is provided, a default value section 224 into which a default or a state of the device is recorded, and an "Etc" section 225 into which the profile of the device can be recorded, if necessary.

That is, the device and the profile are explained by using a FAN as an example. "POWER," "Speed," and "Rotate" may be recorded into the service name section 221. Accordingly, in the description section 222, POWER means on/off of a FAN power source, Speed means a rotation speed of a FAN, and Rotate means rotation of a rotor head.

Further, in the current value section 223, the off state of the power source and speed may display a stop, and Rotate may display an off state. In the default value section 224, Power may be set to off state, Speed may be set to a "1" state, and Rotate may be set to off state, according to the functions of each device. Further, with respect to speed, when it is possible to display a step 4 steps, a user can use the device easily and conveniently by recording the contents the "Etc" section 225.

Below, the procedures for registering each device or service profile and requesting services will be explained.

Figure 4:
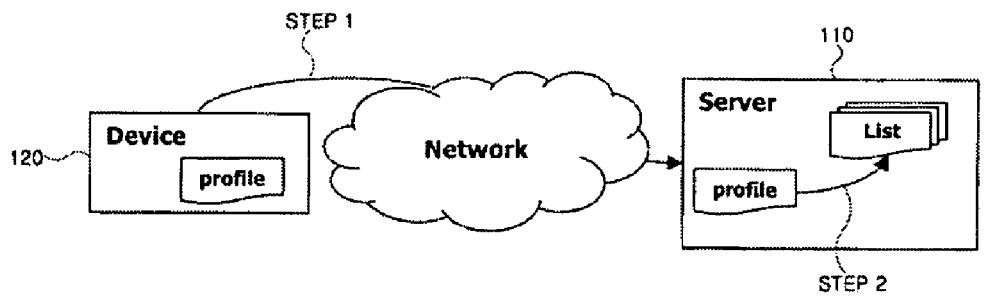
FIG. 4 is a block diagram schematically showing a flow for registering a device in a home network and a service profile related to it.

FIG. 4 is a block diagram schematically showing a flow for registering a device in a home network and a service profile related to it. The controller 122 of each device 120 reads a device profile and a service profile of the device from the device profile section 124, and transmits it to the net I/O 128 and the network 130 as a transmission message type having a predetermined transmission format (first step). At this time, the device profile and the service profile are transmitted as the case in FIG. 3.

The server 110 which receives the message in the first step transmits it to the profile manager 112 after processing the message with the service logic or the service application which are provided to the device by the service logic unit 116. The Profile manager 112 registers the transmitted device and the service profile into the device profile list 114. By repeating above procedures, it is possible to register each device and the service profile of the home network.

The procedures for requesting and processing a predetermined service using the registered profile as above will be explained by referring to the drawings.

Figure 5:
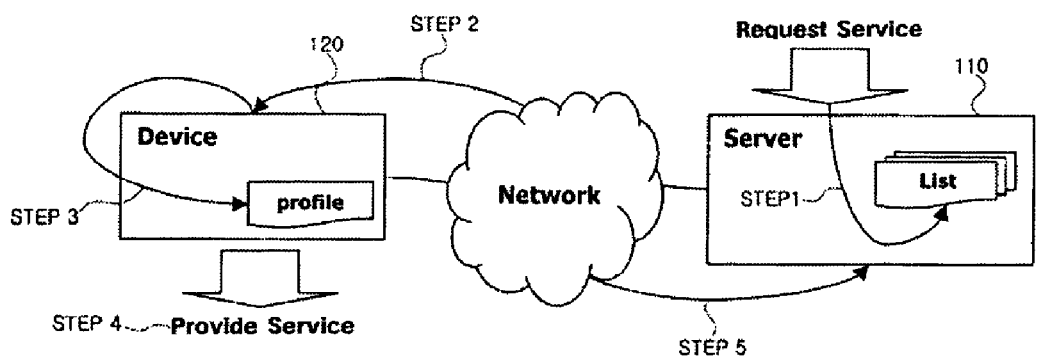
FIG. 5 is a view showing a flow for requesting and processing a predetermined by using a registered profile.

As is shown in FIG. 5, if a predetermined service is requested by an application or the service logic unit 116 of the server 110, the profile manager 112 searches whether the service is valid or not in the device profile list 114 (Step 1). If it is judged that the service is valid, the device profile and the service profile corresponding to the service are transmitted to the device 120 as a transmission message format (Step 2).

The controller 122 of the device 120 converts the received transmission message into the profile of the device and service, compares it with the profile stored into the device profile 124, and verifies the service (Step 3). Further, the controller drives the device 120 to allow the verified service to be provided, and ACK of the service to be transmitted to the server 110 (Step 5).

The above-mentioned predetermined service processing flow will be explained in detail by referring to the drawings.

Figure 6:
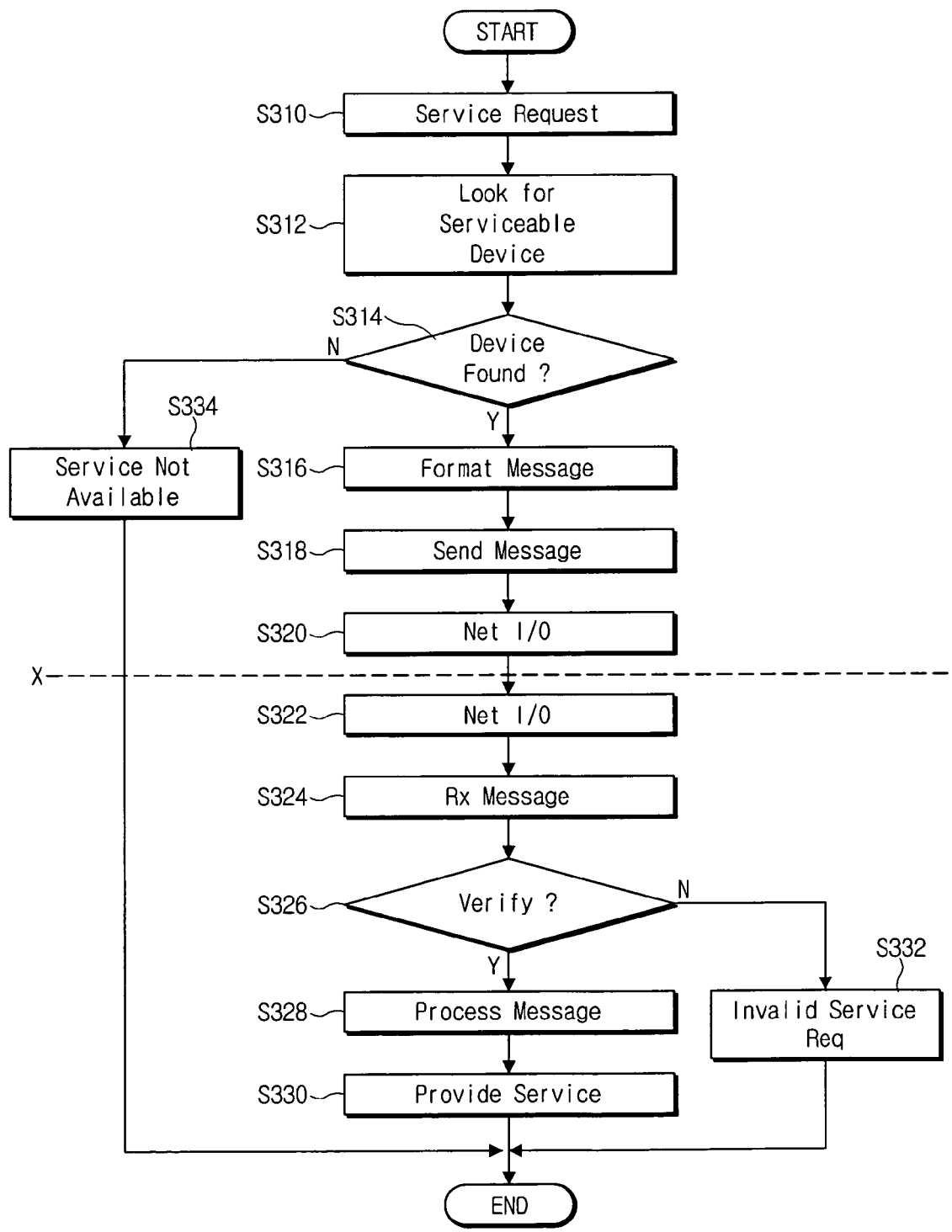
FIG. 6 is a view showing a flow for requesting and processing a predetermined service.

FIG. 6 is a flow chart showing the procedures through which a predetermined service is requested and processed. If a predetermined service is requested by an application or the service logic unit 116 of the server 110 (S310), the profile manager 112 searches whether the service is valid or not in the device profile list 114 (S312). At this time, it is possible to request a corresponding service in the service logic unit 116 to provide an artificial intelligence service. That is, when that a virtual service environment is set to view a DVD, it is possible to form a device profile description for controlling the devices necessary for viewing the DVD such as a DVD, a TV, a curtain, and an illumination device, and to request the services. To be more specific, the first step for viewing a DVD is to lower the curtain, request a service providing the illumination suitable for DVD viewing, and request a service turning on the TV.

If a device to provide the service is searched by referring to the device profile description (S314), the profile manager 112 formats a device/service profile including the device profile description 200 as a transmission message so that the device/service profile including the device profile description 200 can be transmitted via the network 130 (S316), and transmits it to the net I/O 118 (S318). The net I/O 118 transmits the transmission message to the device 120 via the network 130 (S320).

At this time, the format of the message to be transmitted is transmitted as a profile type. ASCII, binary, and XML can be the profile type, and the contents of the profile type can include a client address, a location, and etc. For example, with respect to the client address, since the address representation methods of the networks (IP, PLC and etc.) used in the client are different, the address and the location of the network technology are transmitted to a server, and they are managed as a profile type in the server. Then, if the client device is accessed, a network protocol and the address of this device are obtained and accessed through the profile manager.

Further, in the step (S314), if the device to perform the services is not searched, the service is judged as invalid and is terminated (S334).

If the net I/O 128 of the device 120 receives the message (S322), the controller 122 receives the message (S324), and verifies whether it is valid or not in the device profile 124 (S326). If the service is judged as valid, the controller 122 drives the device so that the messages are processed (S328) and the service is provided (S330).

Further, in the step (S326), if the message is judged as invalid, the service is invalidated and terminated (S332).

After the service is executed, an ACK representing whether the service is executed or not can be transmitted to the server 110 which send the message.

If the first step for lowering the curtain in order to view a DVD through above-mentioned procedures is completed, the artificial intelligence requests a service providing the illumination suitable for DVD viewing to regulate the illumination, and requests a service turning on TV once again.

In this way, if setting a surrounding environment necessary for viewing a DVD is completed, finally the users turn on a TV and view.

In the above descriptions, DVD viewing is explained as an example for the sake of convenience, but a home service belonging to the home network can be designed to provide complicated artificial intelligence services.

The specific exemplary embodiments of the present invention are explained in detail, but it is apparent to the persons skilled in the art that various modifications and corrections may be made within the scope of technical concepts of the present invention. Such modifications and corrections are within the scope of the attached claims. As mentioned above, if the service framework of the home network service according to exemplary embodiments of the present invention is used, it is possible to manage many devices in the home network efficiently and simply without using a complicated middleware.

Although an exemplary embodiment of the present invention has been described, it will be understood by those skilled in the art that the present invention should not be limited to the described exemplary embodiments, but various changes and modifications can be made within the spirit and scope of the present invention as defined by the appended claims.

What is claimed is:

1. A controlling method of a home network comprising a plurality of devices having different respective functions and which are to be controlled, and a server for requesting a service from the plurality of the controlled devices, wherein the operation of the server comprises:
   registering a device profile and a service profile of the controlled devices; and
   requesting a service by transmitting the device profile and the service profile to the plurality of devices having different respective functions requested to be applied simultaneously to perform the service, and by controlling the plurality of devices having the different respective functions requested to be applied simultaneously to perform the service,
   wherein the different respective functions of the plurality of devices, requested to be applied simultaneously to perform the service are specific to each of the plurality of devices, and
   wherein each of the different respective functions relate to controlling the plurality of devices, respectively.

2. The controlling method of a home network according to claim 1, wherein the registering a device profile and a service profile comprises:
   receiving the device profile and the service profile converted into a transmission message from the controlled devices; and
   converting the converted message into a device profile and a service profile and registering.

3. The controlling method of a home network according to claim 1, wherein the requesting a service from the controlled device comprises:
   converting the registered device profile and the registered service profile into a transmission message so as to transmit the message through a network; and
   transmitting the device profile and the service profile converted into a transmission message to the controlled devices.

4. The controlling method of a home network according to claim 3, wherein the controlled device stores the converted device profile and the converted service profile into a memory and transmits the device profile and the service profile to the server.

5. The controlling method of a home network according to claim 4, wherein the controlled devices compare the device profile and the server profile transmitted from the server with the device profile and the server profile stored in a memory and only if they are judged to be identical, the controlled devices execute a service.

6. The controlling method of a home network according to claim 5, wherein the controlled device notifies whether the service is executed to the server.

7. A controlling method of a home network comprising a plurality of devices having different respective functions and which are to be controlled, and a server for requesting a service by transmitting a device profile and a service profile to the plurality of devices having the different respective functions requested to be applied simultaneously to perform the service, and by controlling the plurality of devices having the different respective functions requested to be applied simultaneously to perform the service from the plurality of the controlled devices to provide or perform the service, wherein the different respective functions of the plurality of devices, requested to be applied simultaneously to perform the service are specific to each of the plurality of devices, and wherein the operation of the controlled devices comprise:
   transmitting the device profile and the service profile of the controlled devices to the server;
   receiving a device profile and a service profile corresponding to the service from the server;
   comparing the device profile and the service profile corresponding to the service with the device profile and service profile stored in the controlled devices; and
   executing the service according to the result of the comparison,
   wherein each of the different respective functions relate to controlling the plurality of devices, respectively.

8. The controlling method of a home network according to claim 7, wherein the transmitting the device profile and the service profile to a server comprises:
   generating the device profile and the service profile; and
   converting the generated device profile and the generated service profile into a transmission message so as to be transmitted to the sever through a network and transmitting it to the server.

9. The controlling method of a home network according to claim 7, wherein the receiving the device profile or/and the service profile comprises:
   receiving the device profile and the service file converted into a transmission message from the server; and
   converting the received message into a device profile and a service profile.

10. The controlling method of a home network according to claim 8, further comprising storing the generated device profile and service profile into a memory.

11. The controlling method of a home network according to claim 7, wherein the executing the service according to the result of the comparison comprises executing the service if the device profile and service profile transmitted from the server and the device profile and service profile stored in the memory are judged to be identical.

12. The controlling method of a home network according to claim 7, further comprising notifying whether the service is executed to the server.

13. A server for requesting a service to controlled devices in a home network having a plurality of devices to be controlled to provide or perform a service, wherein the server requests a service by transmitting a pre-stored device profile and a pre-stored service profile to devices having different respective functions requested to be applied simultaneously to perform the service, and by controlling the devices having different respective functions requested to be applied simultaneously to perform the service,
   wherein the different respective functions requested to be applied simultaneously to perform the service are specific to each of the plurality of devices, wherein each of the different respective functions relate to controlling the plurality of devices, respectively.

14. The server according to claim 13, comprising:
a device profile list section for registering a device profile and a service profile of the controlled device;
a profile manager for managing the device profile and the service profile of the device profile list section, and for processing at least one function regarding the service profile; and
a service logic section for forming a message for connection between a real service and a structure of a profile having a meta data format defined in the server, and generating and controlling the device profile and/or the service profile.

15. An apparatus for providing a service according to a request by a server in a home network including a plurality of devices having different respective functions, which are to be controlled, and the server, wherein the apparatus executes a service according to the result of the comparison between a device profile and a service profile provided by the server and a pre-stored device profile and a pre-stored service profile,
wherein the apparatus executes the service with at least one device which receives the device profile and the service profile and has a different function requested to be applied simultaneously to perform the service,
wherein the different respective functions of the plurality of devices, requested to be applied simultaneously to perform the service are specific to each of the plurality of devices,
wherein each of the different respective functions relate to controlling the plurality of devices, respectively.

16. The apparatus according to claim 15, comprising:
a device profile section for storing a device profile and a service profile of the controlled devices;
a controller which includes an application or a logic element for generating each profile, storing the profile to the device profile section, and executing a corresponding operation or a service; and
a service I/O (input and output) section which acts as an interface for controlling an inside device logic executing the services or a service, wherein the service I/O is controlled by the controller to provide a service.

17. The controller according to claim 16, wherein the controller transmits a corresponding device profile and a service profile stored in the device profile section to the server, and registers the corresponding device profile and a service profile to the server.

18. The controller according to claim 16, wherein if a message formed by the device profile and/or the service profile is transmitted from the service, the controller confirms the information from the device profile section, and controls the controlled devices to provide the services through the service I/O section.

* * * * *